United States Patent
Choi et al.

(10) Patent No.: US 10,324,524 B2
(45) Date of Patent: Jun. 18, 2019

(54) METHOD AND APPARATUS FOR USER INTERFACE USING GAZE INTERACTION

(71) Applicant: SAMSUNG ELECTRONICS CO., LTD., Suwon-si (KR)

(72) Inventors: Chang Kyu Choi, Seongnam-si (KR); Sung Joo Suh, Seoul (KR); Joon Ah Park, Seoul (KR); Du Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 14/164,617

(22) Filed: Jan. 27, 2014

(65) Prior Publication Data

US 2014/0232638 A1 Aug. 21, 2014

(30) Foreign Application Priority Data

Feb. 21, 2013 (KR) ........................ 10-2013-0018394

(51) Int. Cl.
*G06F 3/01* (2006.01)
(52) U.S. Cl.
CPC .................. *G06F 3/013* (2013.01)
(58) Field of Classification Search
CPC ..... G06F 3/013; G06F 21/31; G06K 9/00604; A61B 3/113
See application file for complete search history.

(56) References Cited

U.S. PATENT DOCUMENTS

| | | | |
|---|---|---|---|
| 8,235,529 B1 | 8/2012 | Raffle et al. | |
| 2002/0105482 A1* | 8/2002 | Lemelson | G06F 3/0485 345/7 |
| 2008/0186449 A1* | 8/2008 | Sur | G06K 9/00604 351/210 |
| 2008/0284980 A1* | 11/2008 | Skogo | A61B 3/113 351/210 |
| 2010/0079508 A1* | 4/2010 | Hodge | G06F 3/013 345/697 |
| 2010/0118200 A1* | 5/2010 | Gelman | G06F 3/041 348/578 |
| 2011/0085139 A1* | 4/2011 | Blixt | A61B 3/113 351/209 |
| 2011/0228975 A1* | 9/2011 | Hennessey | A61B 3/113 382/103 |
| 2011/0254865 A1 | 10/2011 | Yee et al. | |
| 2012/0094700 A1* | 4/2012 | Karmarkar | G06F 3/013 455/466 |
| 2012/0117643 A1* | 5/2012 | Orr | G08C 19/00 726/19 |

(Continued)

FOREIGN PATENT DOCUMENTS

KR  10-2011-0108647  10/2011
KR  10-2012-0085461  8/2012

*Primary Examiner* — Sepehr Azari
(74) *Attorney, Agent, or Firm* — NSIP Law (57) ABSTRACT

A method and apparatus for a user interface using a gaze interaction is disclosed. The method for the user interface using the gaze interaction may include obtaining an image including eyes of a user, estimating a gaze position of the user, using the image including the eyes of the user, and determining whether to activate a gaze adjustment function for controlling a device by a gaze of the user, based on the gaze position of the user with respect to at least one toggle area on a display.

20 Claims, 7 Drawing Sheets

(56) References Cited

U.S. PATENT DOCUMENTS

| | | | |
|---|---|---|---|
| 2013/0187773 A1* | 7/2013 | Tsou | G06F 21/31 340/540 |
| 2014/0218281 A1* | 8/2014 | Amayeh | A61B 3/14 345/156 |
| 2015/0109191 A1* | 4/2015 | Johnson | G10L 15/22 345/156 |

* cited by examiner

METHOD AND APPARATUS FOR USER INTERFACE USING GAZE INTERACTION

CROSS-REFERENCE TO RELATED APPLICATIONS

This application claims the priority benefit of Korean Patent Application No. 10-2013-0018394, filed on Feb. 21, 2013, in the Korean Intellectual Property Office, the disclosure of which is incorporated herein by reference.

BACKGROUND

1. Field

Example embodiments relate to a method and apparatus for a user interface using a gaze interaction.

2. Description of the Related Art

Currently, a significant number of gaze interaction technologies, using at least two external light sources and at least two cameras, may be used to estimate a gaze of a user.

With the development of information technology, gaze interaction technologies are being utilized in a variety of fields. For example, in the advertisement field, advertising draft plans are shown to consumers to determine whether consumers place a greater emphasis on a product, a commercial model, or a company brand by collecting information about a position at which the consumers gaze and information about a period of time consumers gaze at the advertising draft plans. Also, in the marketing field, multiple contents are provided to a device, and a user preference grade may be marked highly with respect to contents people gaze at for a long period of time with interest. Such gaze interaction technology is expected to be applied in an even greater variety of fields. Accordingly, extensive research is being conducted to recognize a gaze of a user more accurately and to use the interaction recognition technology more conveniently.

SUMMARY

The foregoing and/or other aspects are achieved by providing a method for a user interface using a gaze interaction, the method including obtaining an image including eyes of a user, using a camera, estimating a gaze position of the user, using the image including the eyes of the user, and determining whether to activate a gaze adjustment function for controlling a device by a gaze of the user, based on the gaze position of the user with respect to at least one toggle area on a display.

The obtaining of the image including the eyes of the user may include obtaining an image including the eyes of the user, based on at least two internal light sources included in the display.

The at least one toggle area may include at least one of a plurality of objects displayed on the display.

The estimating of the gaze position of the user may include extracting respective positions of at least two glints, an area in which the at least two internal light sources are displayed on the eyes of the user, respectively, based on the image including the eyes of the user, calculating a position of a cornea center of the eyes of the user, using respective positions of the at least two internal light sources and the respective positions of the at least two glints, calculating respective positions of a pupil center of the eyes of the user, using the respective positions of the cornea center of the eyes of the user, calculating respective directions of an optical axis of the eyes of the user, using the respective positions of the cornea center and the respective positions of the pupil center, calculating respective directions of a visual axis of the eyes of the user, based on the respective directions of the optical axis, and identifying the gaze position, using an intersection point of respective visual axes of the eyes of the user.

The method for the user interface using the gaze interaction may further include removing noise by at least one external light source.

The removing of the noise by the at least one external light source may include analyzing an image including the eyes of the user, and separating the at least two internal light sources and the at least one external light source, using a result of the analysis.

The removing of the noise by the at least one external light source may further include changing at least one of a position, a color, and a shape of the at least two internal light sources, and estimating the gaze position of the user, based on the at least two internal light sources changed.

The determining of whether to activate the gaze adjustment function may include determining whether the gaze position matches the at least one toggle area, and setting the gaze adjustment function to be an activation mode or a deactivation mode, based on a result of the determination.

The determining of whether the gaze position matches the at least one toggle area may further include determining whether the gaze position matches the at least one toggle area during a predetermined period of time.

The determining of whether the gaze position matches the at least one toggle area may further include determining whether the gaze position matches the at least one toggle area, based on a predetermined pattern.

The determining of whether to activate the gaze adjustment function may further include setting a default value of the gaze adjustment function to be the deactivation mode, setting the gaze adjustment function to be the activation mode during the predetermined period of time when the gaze position matches the at least one toggle area, based on a result of the determination.

The method for the user interface using the gaze interaction may further include setting at least two vertex areas from among a plurality of vertex areas of the display to be the at least two internal light sources.

The foregoing and/or other aspects are achieved by providing a method for a user interface using a gaze interaction, the method including obtaining an image including eyes of a user, using at least two internal light sources included in a display and a camera, and estimating a gaze position of the user, using the image of the eyes of the user.

The foregoing and/or other aspects are achieved by providing a system for a user interface using a gaze interaction, the system including a display, a camera, an image obtaining unit to obtain an image including eyes of a user, using the camera, a gaze position estimating unit to estimate the gaze position of the user, using the image including the eyes of the user, and a mode determining unit to determine whether to activate a gaze adjustment function for controlling a device by the gaze of the user, based on the gaze position of the user with respect to at least one toggle area on the display.

The foregoing and/or other aspects are achieved by providing a system for a user interface using a gaze interaction, the system including a display, at least two internal light sources included in the display, a camera, an image obtaining unit to obtain an image including eyes of a user, using the at least two internal light sources and the camera, and a gaze position estimating unit to estimate the gaze position of the user, using the image including the eyes of the user.

The foregoing and/or other aspects are achieved by providing a user interface method in a mobile device having a display. The method includes displaying an icon on the display while a user waits for content to be loaded onto the display, and estimating a gaze position of the user by using the icon as a calibration point.

The foregoing and/or other aspects are achieved by providing a method of unlocking content of a mobile device having a display with a plurality of toggle areas. The method includes monitoring a gaze position of a user, determining, based on the monitored gaze position, whether the user has gazed at the toggle areas according to a predetermined pattern, and unlocking the content of the mobile device when it has been determined that the user has gazed at the toggle areas according to the predetermined pattern.

The foregoing and/or other aspects are achieved by providing a method of locking content of a mobile device having a display with a plurality of toggle areas. The method includes monitoring a gaze position of a user, determining, based on the monitored gaze position, whether the user has gazed at the toggle areas according to a predetermined pattern; and locking the content of the mobile device when it has been determined that the user has gazed at the toggle areas according to the predetermined pattern.

The foregoing and/or other aspects are achieved by providing a method of changing content of a mobile device having a display with a plurality of toggle areas. The method includes monitoring a gaze position of a user, determining, based on the monitored gaze position, whether the user has gazed at the toggle areas according to a predetermined pattern, activating an activation mode of the mobile device when it has been determined that the user has gazed at the toggle areas according to the predetermined pattern; and changing the content of the mobile device based on the monitored gaze position of the user and a predetermined rule when the activation mode has been activated.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1A:
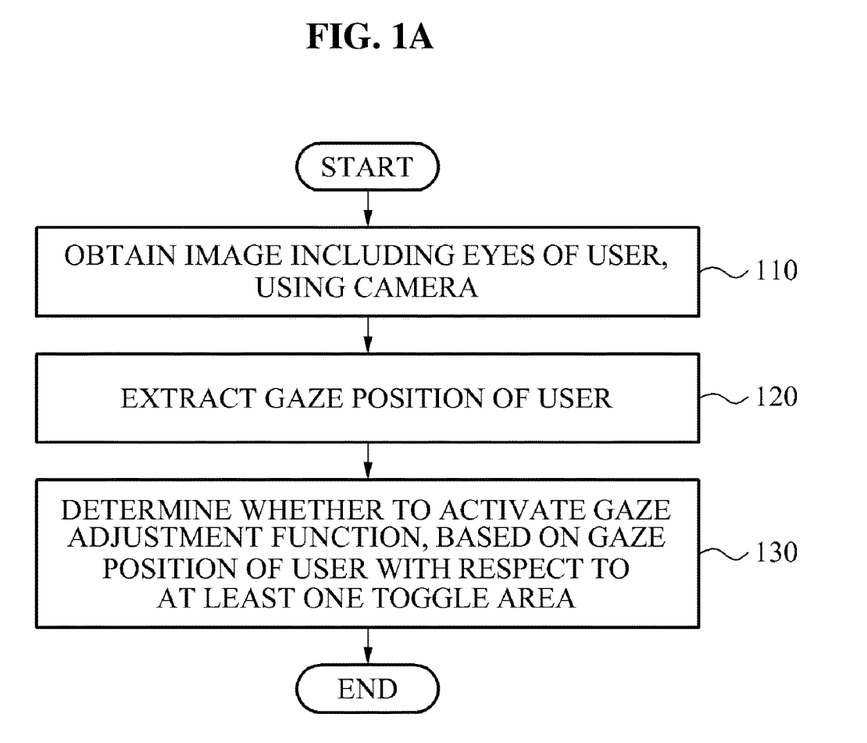
FIG. 1A illustrates a method for a user interface using a gaze interaction according to example embodiments.

FIG. 1A illustrates a method for a user interface using a gaze interaction according to example embodiments.

Referring to FIG. 1A, in operation 110, the method for the user interface using the gaze interaction may obtain an image, including eyes of a user, using a camera. Here, the camera may be included in a device, or may be disposed outside the device. The device may be configured as a display or in a plurality of other configurations, and may include a mobile device, a television (TV), a tablet, a personal computer (PC) monitor, a digital information display, a medical image display, a holographic display, a multi-view three-dimensional (3D) display, and the like. Also, the term "display" may refer to an apparatus for representing data such as a character, a diagram, or an image in the device.

The camera may capture an image including the eyes of the user. In this instance, a quantity of cameras capturing the image including the eyes of the user may be at least one camera.

The method for the user interface using the gaze interaction may obtain the image including the eyes of the user, based on a light source to recognize a gaze position of the user precisely. More particularly, the method for the user interface using the gaze interaction may obtain the image including the eyes of the user using the camera, based on at least two internal light sources. Here, the at least two internal light sources may include a point light source in the display. More particularly, the method for the user interface using the gaze interaction may set at least two vertex areas, from among a plurality of vertex areas of the display, to be at least two internal light sources. For example, when the display is a square, the method for the user interface using the gaze interaction may set two vertex areas from among four vertex areas to be internal light sources. Accordingly, power efficiency may be enhanced in a system requiring low power such as a mobile device, and the like, using light emitted from the display as a light source, without using an additional light source. Also, noise typically generated by an external light source may be removed more easily using an internal light source. For example, in a case of the mobile device, a direction of a camera of the mobile device may face upward because a user generally faces a display portion of the mobile device in relation to an upward direction of the display portion. Hence, there may be an increased probability of a camera of being exposed to an external light source such as an internal lightning, and the like, and thereby an increased occurrence of noise. In this instance, the method for the user interface using the gaze interaction may determine information about an image shown on the display in advance. Transitively, separating the internal light sources and the external light sources in the display may be performed more efficiently.

In operation 120, the method for the user interface for the gaze interaction may estimate a gaze position of a user, using an image including eyes of the user. More particularly, with reference to FIG. 1B, the method for the user interface using the gaze interaction may extract a position of at least two glints, based on the image including the eyes of the user. Here, the at least two glints may refer to one or more areas in which reflections of the at least two internal light sources are displayed on the eyes of the user, respectively (operation 121). Accordingly, a quantity of glints for a single eye may correspond to a quantity of internal light sources. For example, when the number of internal light sources used is two, the internal light sources may be displayed on the eyes, respectively. Therefore, the number of glints for the single eye may be equal to the number of internal light sources, in this example, two.

Figure 1B:
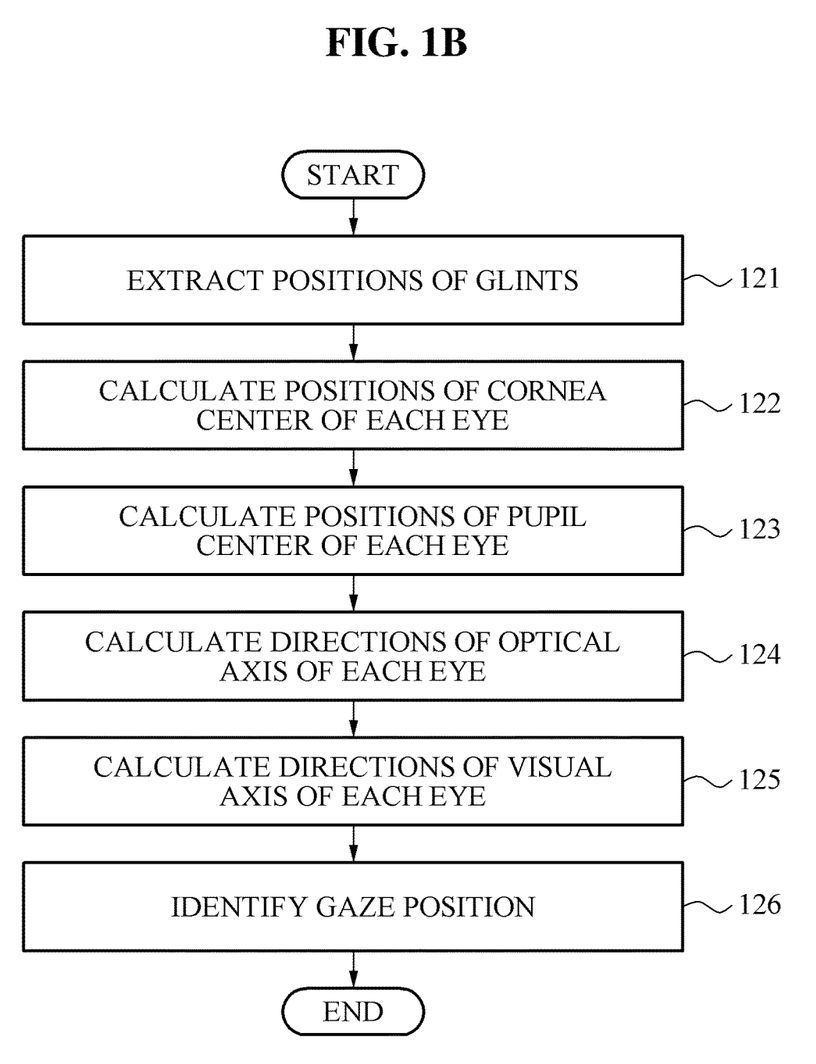
FIG. 1B illustrates details of the gaze estimation process 120 of FIG. 1A.

In operation 122, the method for the user interface for the gaze interaction may calculate a position of a cornea center of the eyes, respectively, using the position of the at least two internal light sources and the position of the at least two glints. More particularly, the method for the user interface using the gaze interaction may extract a first plane including a first internal light source, from one of two internal light sources, a cornea surface on which the first internal light source is displayed, and a first glint image corresponding to the first internal light source. Further, a second plane corresponding to a second internal light source, from another of the two internal light sources, may be extracted, and the cornea center may be calculated using an intersection point of the first plane and the second plane.

More particularly, the first plane may be extracted based on Equation 1 because a cornea may perform the same role as a reflection surface with respect to a light source, an incident ray and a reflected ray may be on the same plane based on a law of reflection, and an incidence angle and a reflection angle may be equal.

$$r_1 = 2(n_1 \cdot l_1)n_1 - l_1 \qquad \text{[Equation 1]}$$

Here, $r_1$ denotes a unit vector in a $.G_{1img}$ direction representing a position of a first glint image. Here, $.G_{1img}$ represents a corneal reflex generated in a camera by a first internal light source. $l_1$ denotes a unit vector in a $(L_1-G_1)$ direction wherein $L_1$ represents the first internal light source of the two internal light sources, and $G_1$ represents a normal of the cornea surface at an index point with respect to the first internal light source. $n_1$ denotes a normal vector at an index point in $(G_1-C)$ direction wherein C represents a cornea center. The method for the user interface using the gaze interaction may generate the first plane including the first internal light source, the cornea surface on which the first internal light source is displayed, and the first glint image, using $r_1$.

The second plane may be extracted using Equation 2 as the first plane is extracted.

$$r_2 = 2(n_2 \cdot l_2)n_2 - l_2 \qquad \text{[Equation 2]}$$

Here, $r_2$ denotes a unit vector in a $G_{2img}$ direction representing a position of a second glint image. Here, $G_{2img}$ represents a corneal reflex generated in a camera by a second internal light source. $l_2$ denotes a unit vector in a $(L_2-G_2)$ direction wherein $L_2$ represents the second light source, and $G_2$ represents a normal of a cornea surface at an index point with respect to the second light source. $n_2$ denotes a normal vector at an index point of a $(G_2-C)$ direction. The method for the user interface using the gaze interaction may generate the second plane, using $r_2$.

The method for the user interface using the gaze interaction may estimate an interaction line $R_{cornea}$ of the first plane and the second plane, using the first plane and the second plane. Also, the method for the user interface using the gaze interaction may calculate a corneal curvature radius $r_c$, to extract the cornea center. Here, $r_c$ may be calculated based on Equation 3.

$$|G_2 - C_{L2}| = |G_1 - C_{L1}| = r_c \qquad \text{[Equation 3]}$$

Here, $C_{L1}$ and $C_{L2}$ denote a cornea center estimated using the first light source and the second light source. $C_{L1}$, $C_{L2}$, and C may be equal to one another as defined in $C_{L1} = C_{L2} = C$. Accordingly, the method for the user interface using the gaze interaction may generate $r_c$ based on Equation 3 and that $C_{L1} = C_{L2} = C$. Also, the method for the user interface using the gaze interaction may calculate a position of a cornea center C, using $R_{cornea}$ and $r_c$.

In operation 123, the method for the user interface using the gaze interaction may calculate a position of a pupil center of the eyes, respectively, using the position of the cornea center of the eyes, respectively. More particularly, when a pupil is assumed to be included in a predetermined plane Π, the pupil center may be disposed on the plane Π. The plane Π may be represented based on Equation 4 because a distance between the cornea center C and a pupil center E may be obtained by $|E-c|$.

$$\frac{(E-C)}{|E-C|} \cdot [x-C] + |E-C| = 0 \qquad \text{[Equation 4]}$$

Here, x denotes a three-dimensional (3D) point x=(x,y,z) with respect to a camera. The method for the user interface using the gaze interaction may calculate lights reflected off of a cornea $\{f_k|k=1 \ldots n\}$, and determine $\{P_k|k=1, \ldots n\}$ representing contours points of the pupil, using $\{f_k|k=1 \ldots n\}$ because the pupil may project a light reflected off of the cornea. A distance between the respective contour points of the pupil and the pupil center may be consistent, and the distance being consistent may be represented as Equation 5.

$$|P_1-E|=|P_2-E|= \ldots =|P_n-E| \qquad \text{[Equation 5]}$$

Here, $|P_k-E|$ denotes a distance between contour points of a pupil $P_k$ and the cornea center E. Accordingly, the method for the user interface using the gaze interaction may calculate the cornea center E satisfying Equations 4 and 5.

In operation 124, the method for the user interface using the gaze interaction may calculate a direction of an optical axis of the eyes, respectively, using a position of the cornea center and a position of the pupil center. Here, the term "optical axis" may refer to a direction of anatomical eyes. Also, optical axis may refer to a line linking the pupil center and the cornea center, and therefore, the method for the user interface using the gaze interaction may calculate the direction of the optical axis by extracting the line linking the pupil center and the cornea center.

In operation 125, the method for the user interface using the gaze interaction may calculate a direction of a visual axis of the eyes, respectively, based on the direction of the optical axis. Here, the visual axis may refer to a direction in which a user actually gazes at an object. The visual axis may refer to a straight line linking a fovea and the cornea center because an image may be displayed on the fovea by refraction of the cornea.

More particularly, an angle difference between the optical axis and the visual axis may exist by an amount of an angular offset β. The angular offset β may be calculated based on Equation 6.

$$\cos\beta = \frac{(E-C) \cdot (P_c-C)}{|E-C||P_c-C|} \qquad \text{[Equation 6]}$$

Here, $P_c$ denotes a calibration point. More particularly, a shape of eyes and a refractive index of a cornea may differ from users. Accordingly, the method for the user interface using the gaze interaction may define a line linking the calibration point $P_c$ and a cornea center C to be a visual axis, and using the defining of the line, the angular offset β may be calculated. The visual axis differing by the amount of the angular offset β may be calculated using the calculated angular offset β.

The method for the user interface using gaze interaction may generate the visual axis of the eyes, respectively, and identify a gaze position of the user, using an interaction point of the visual axis of the eyes, respectively (operation 126). For example, the method for the user interface using the gaze interaction may calculate a direction of a first visual axis, being a visual axis of a left eye of the user and a direction of a second axis, being a visual axis of a right eye of the user. An intersection point of the first visual axis and the second visual axis may be extracted, and a position of the intersection point may be set to be an actual gaze position of the user.

The method for the user interface using the gaze interaction may remove noise by at least one external light source. More particularly, the method for the user interface using the gaze interaction may analyze an image including eyes of a user. At least two internal light sources and the at least one external light source may be separated, using a result of the analysis. For example, when a glint is generated by an external light source, the method for the user interface using the gaze interaction may determine a configuration, a color, a shape, and the like, of an image by analyzing the image including the eyes of the user. The glint by the external light source may be identified by separating internal light sources from the external light source. The glint may be removed by the external light source, or the noise by the external light source may be removed by performing a gaze interaction using only glints by internal light sources rather than the glint by the external light source.

Figure 1C:
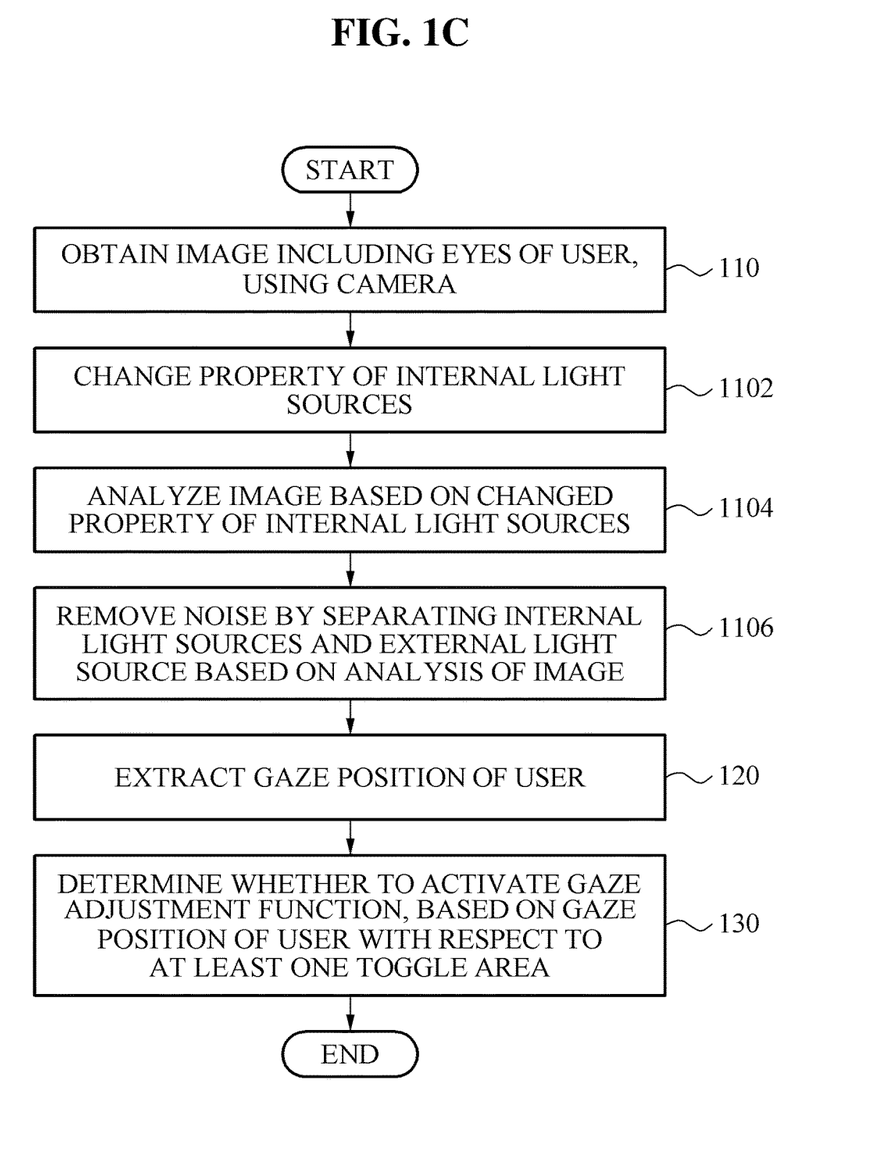
FIG. 1C illustrates a more detailed method for a user interface using gaze interaction with noise removal according to example embodiments.

For example, with reference to FIG. 1C, when noise occurs by the external light source, the method for the user interface using the gaze interaction may change at least one of a position, a color, and a shape of the at least two internal light sources (operation 1102). Subsequently, an image may be analyzed (operation 1104), and the noise by the external light source may be removed by performing gaze estimation using only glints by the changed internal light sources (operation 1106). Accordingly, a gaze position of the user may be estimated based on the at least two internal light sources changed. For example, when distinguishing the glint by the external light source from the glints by the internal light sources is difficult, the method for the user interface using the gaze interaction may change at least one of the position, the color, and the shape of the at least two internal light sources so as to be distinguished from the external light source. A precise gaze interaction from which noise has been removed using only the glints by the at least two changed internal light sources may be performed (operation 120).

In operation 130, the method for the user interface using the gaze interaction may determine whether to activate a gaze adjustment function, based on a gaze position of a user with respect to at least one toggle area on a display. Here, the gaze adjustment function may refer to a function for controlling an interface of a device, using a gaze. The at least one toggle area may refer to a predetermined area present on the display for determining whether to activate or deactivate the gaze adjustment function. Accordingly, the user may determine whether to activate the gaze adjustment function with a gaze only, rather than using a hand of the user or another device such as a remote control or a stylus.

The at least one toggle area may include at least one calibration point. The gaze position of the user may be estimated more precisely, using the at least one toggle area as the at least one calibration point.

Additionally, the at least one toggle area may include at least one of the plurality of objects displayed on the display. Here, the plurality of objects may refer to a total of data, such as a character, a diagram, an image, and the like, displayed on the display. For example, the at least one toggle area may include a status bar displayed on the display. Here, the status bar may refer to a configuration providing information on a status of a device to the user. Generally, the user may move a gaze direction to the status bar readily because the status bar may be displayed on the display at all times. Thus, through more convenient use of a gaze, the gaze adjustment function may be activated or deactivated by the user.

At least one of the plurality of objects displayed on the display may be used as a calibration point. For example, the at least one calibration point may include a progress bar. Here, the progress bar may refer to a configuration representing a status of a progress, for example, a status of a download. As such, when the progress bar is the calibration point, the user may gaze at a tip of the progress bar, and through calibrating using the tip of the calibration bar, the method for the user interface using the gaze interaction may estimate the gaze position of the user more precisely. As another example, the method for the user interface using the gaze interaction may use an icon, for example, an hourglass icon, represented during operation of a mouse or a program as the calibration point, and may use an icon, for example, a spiral icon, represented during loading of an online page as the calibration point.

The method for the user interface using the gaze interaction may determine whether the gaze position matches the at least one toggle area. Here, the matching of the gaze position and the at least one toggle area may refer to the user gazing at the at least one toggle area. The method for the user interface using the gaze interaction may set the gaze adjustment function to be in an activation mode or a deactivation mode, based on a result of the determination. For example, the method for the user interface using the gaze interaction may identify a current mode of the gaze adjustment function, and based on the result of the determination whether the gaze position matches the at least one toggle area, may set a mode of the gaze adjustment function. As a detailed example, when the gaze adjustment function is on the deactivation mode, and the gaze position matches the at least one toggle area, the mode of the gaze adjustment function may be changed to the activation mode. In this instance, when the gaze position fails to match the at least one toggle area, the deactivation mode may be maintained. When the user gazes at the at least one toggle area on the activation mode, the mode of the gaze adjustment function may be changed to the deactivation mode. As another example, when the gaze adjustment function is on the deactivation mode, the mode of the gaze adjustment function may be changed to the activation mode through the user gazing at the at least one toggle area. The mode of the gaze adjustment function may be changed to the deactivation mode, when the user fails to gaze at the at least one toggle area during a predetermined activation mode, for example, for a time of one second.

The method for the user interface using the gaze interaction may determine whether the gaze position matches the at least one toggle area during a predetermined period of time. For example, when the predetermined time is three seconds, the method for the user interface using the gaze interaction may determine that the gaze position fails to match the at least one toggle area when the user gazes at the at least one toggle area for two seconds.

The method for the user interface using the gaze interaction may determine whether the gaze position matches the at least one toggle area, based on a predetermined pattern. For example, when a number of toggle areas is three, for example, a first toggle area, a second toggle area, and a third toggle area, the predetermined pattern matches the gaze position in a sequential manner of "the third toggle area—the first toggle area—the second toggle area", the method for the user interface using the gaze interaction may determine that the gaze position matches the toggle areas only when the user gazes at the toggle areas, based on the predetermined pattern. Accordingly, when the user gazes at the toggle areas in the sequential manner of "the third toggle area—the second toggle area—the first toggle area", the gaze position may be determined not to match the toggle areas.

The method for the user interface using the gaze interaction may set a default value of the gaze adjustment function to be the deactivation mode. The setting of the default value may refer to maintaining the deactivation mode when the gaze position fails to match the at least one toggle area. The method may determine whether the gaze position matches the at least one toggle area, and as a result of the determination, when the gaze position matches the at least one toggle area, the gaze adjustment function may be set as the activation mode for a predetermined period of time. For example, as a default, the gaze adjustment function may be set as the deactivation mode. Here, when the user gazes at the at least one toggle area, the mode of the gaze adjustment function may be changed to the activation mode for a predetermined period of time, for example, two seconds. When the predetermined period of time has been completed, the mode of the gaze adjustment function may be changed to the deactivation mode, such as, a default value.

Figure 2:
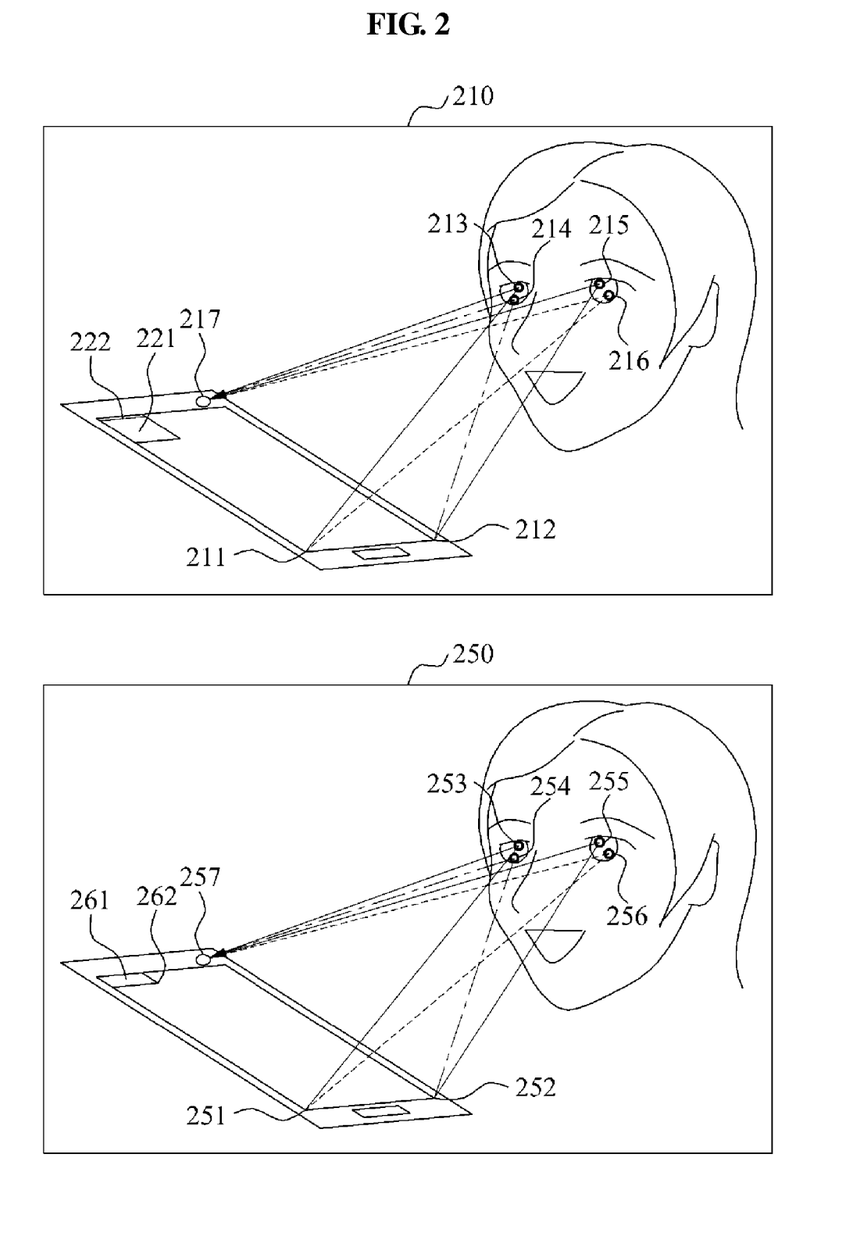
FIG. 2 illustrates estimating of a gaze position according to example embodiments.

FIG. 2 illustrates estimating of a gaze position according to example embodiments.

Referring to FIG. 2, in 210, a mobile device may include two internal light sources 211 and 212, a toggle area 221, and a calibration point 222. In addition, a camera 217 may be included outside of the display. More particularly, the two internal light sources 211 and 212 may be displayed on eyes of a user, and two glints 213 and 214, corresponding to the two internal light sources 211 and 212, may occur on a left eye of the user, and two glints 215 and 216, also corresponding to the two internal light sources 211 and 212, may occur on a right eye of the user. The two internal light sources 211 and 212 may each include, as an example, an LED or pixel emitting light at a particular wavelength. The method for the user interface using the gaze interaction may obtain an image including the eyes of the user on which the glints occur, using the camera. A gaze position of the user may be identified by calculating a position of the glints, a position of a cornea center, a position of a pupil center, a direction of an optical axis, and a direction of a visual axis, based on the image obtained. Here, the calibration point 222 may be disposed on an upper edge of the toggle area 221. As an example, the method for the user interface using the gaze interaction may allow the user to gaze at the calibration point 222 by blinking at the calibration point 222, and through this, a more precise gaze position may be estimated.

In 250, in the mobile device, a camera 257 may be included outside a perimeter of the display as shown in 210, and two internal light sources 251 and 252 may be included within the perimeter of the display. Furthermore, the mobile device in 250 may include a progress bar 261. Here, the progress bar 261 may be used as a toggle area. A calibration point 262 may be disposed on a tip of the progress bar 261. For example, when the progress bar 261 is displayed on the display, the user may naturally or reflexively gaze at the tip of the progress bar 261. Transitively, the camera 257 may obtain an image of gazing at the calibration point 262 by setting a portion gazed at by the user to be the calibration point 262, and the method for the user interface using the gaze interaction may precisely estimate the gaze position of the user.

Figure 3:
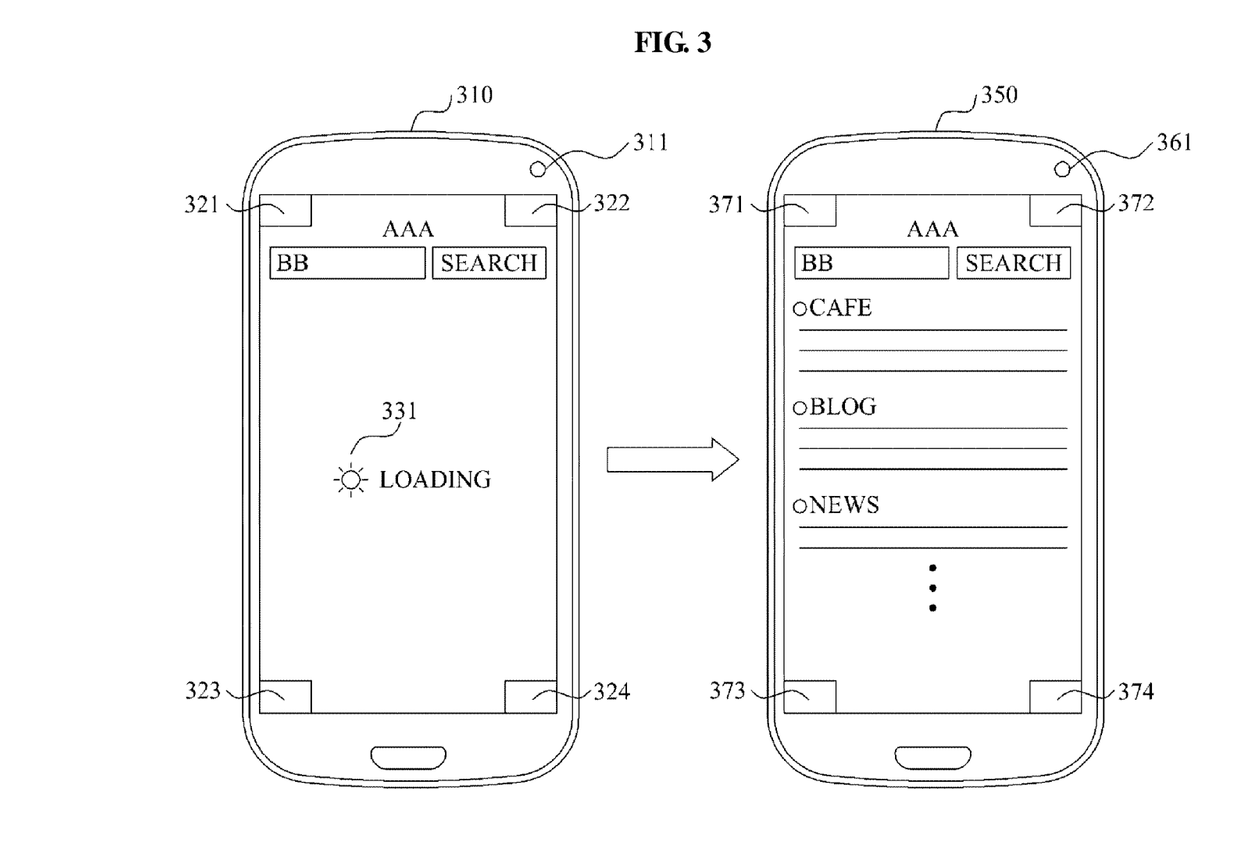
FIGS. 3 and 4 illustrate a method for a user interface using a gaze interaction according to example embodiments.
Figure 4:
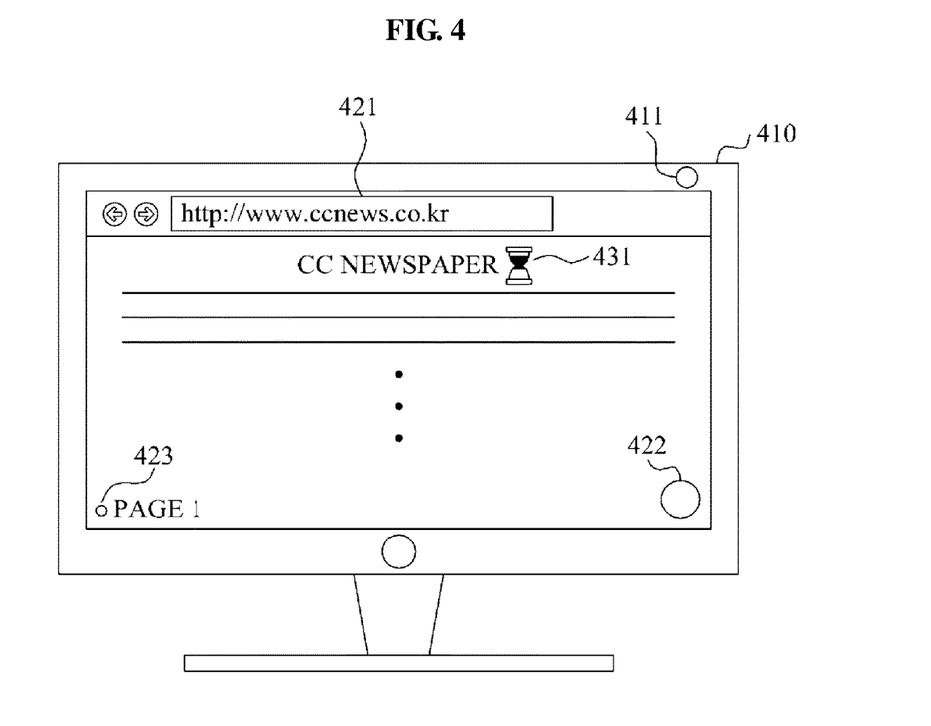

FIGS. 3 and 4 illustrate a method for a user interface using a gaze interaction according to example embodiments.

Referring to FIG. 3, the mobile device 310 may include a camera 311, a display, and four toggle areas 321 to 324. In various embodiments, the four toggle areas 321 to 324 may or may not be displayed on the display.

As a detailed example, a user may perform a search for content BB, subsequent to connecting to a hypothetical website AAA, using the mobile device 310. The mobile device 310 may display a search result page. Here, when loading of the search result page is delayed, a spiral icon 331 may be displayed on the display along with text indicating "loading". In this instance, the user may naturally or reflexively gaze at the spiral icon 331. Transitively, the method for the user interface using the gaze interaction may use the spiral icon 331 as a calibration point, and thereby more precisely estimate the gaze position of the user.

A mobile device 350 may display a search result page, subsequent to the loading, and the user may adjust an interface of the mobile device 350, using a gaze adjustment function. More particularly, the user may gaze at toggle areas 371 through 374 in a sequential manner of "the first toggle area 371—the second toggle area 372—the fourth toggle area 374—the third toggle area 373" for more than a second, respectively, based on a predetermined time, for example, a second, and a predetermined pattern. Transitively, the method for the user interface using the gaze interaction may set the gaze adjustment function to be on an activation mode.

When the gaze adjustment function is on the activation mode, and the user gazes at a bottom portion of the display, the method for the user interface using the gaze interaction may slowly scroll down a search result page displayed based on a predetermined rule. Alternatively, a predetermined area at which the user gazes may be selected based on the predetermined rule.

As another example, when the mobile device 350 is in a lock status, the method for the user interface using the gaze interaction may unlock the lock status of the mobile device 350, using a gaze interaction. More particularly, when the mobile device 350 is in the lock status, the user may gaze at the four toggle areas, respectively, based on a predetermined period of time and a predetermined pattern. When a gaze position is determined to match the four toggle areas, the method for the user interface using the gaze interaction may unlock the lock status of the mobile device 350. Although four toggle areas have been used in the preceding example, any quantity or pattern of toggle areas may alternatively be used.

As still another example, when the mobile device 350 is in an unlock status, the method for the user interface using the gaze interaction may lock the unlock status of the mobile device 350, using a gaze interaction. More particularly, when the mobile device 350 is in the unlock status, the user may gaze at the four toggle areas, respectively, based on a predetermined period of time and a predetermined pattern. When a gaze position is determined to match the four toggle areas, the method for the user interface using the gaze interaction may lock the unlock status of the mobile device 350. Although four toggle areas have been used in the preceding example, any quantity or pattern of toggle areas may alternatively be used. A larger quantity of toggle areas, for example, may be used to increase security of the lock status.

Referring to FIG. 4, a device 410, for example, a personal computer (PC) monitor or a smart television (TV), may include a camera 411 and a display. An online address bar 421, an online page, and two gaze adjustment areas 422 and 423 may be displayed on the display. Here, when the gaze adjustment function is set to an activation mode, the gaze adjustment area may refer to an area for adjusting an interface of the device 410. In particular, the online address bar 421 may refer to a toggle area and a calibration point. For example, when the user gazes at the online address bar 421, the gaze position is determined to match a toggle area corresponding to the online address bar 421, through the online address bar 421 being used as the toggle area, and transitively, the method for the user interface using the gaze interaction may activate the gaze adjustment function. The online address bar 421 may function as the calibration point, through the user gazing at a tip of the online address bar 421, and transitively, a more precise estimation of the gaze position may be possible. As another example, when an online browser of the device 410 is in operation, an hourglass icon 431 may be displayed on the display. In this instance, the gaze position of the user may be estimated precisely, through the method for the user interface using the gaze interaction setting the hourglass icon 431 to be the calibration point because a gaze of the user may be disposed on the hourglass icon 431.

On the activation mode of the gaze adjustment function, when the user gazes at a first gaze adjustment area 422, the method for the user interface using the gaze interaction may capture an image displayed on the display, based on a predetermined rule. When the user gazes at a second gaze adjustment area 423, the method for the user interface using the gaze interaction may display a subsequent web page of a web page displayed on the display. Also, the user may use a function associated with copying, pasting, and the like, of a web page, using the gaze adjustment area. In another embodiment, a user may switch between applications when the user gazes at a first gaze adjustment area 422, the second gaze adjustment area 423, or a predetermined pattern of gaze adjustment areas.

Figure 5:
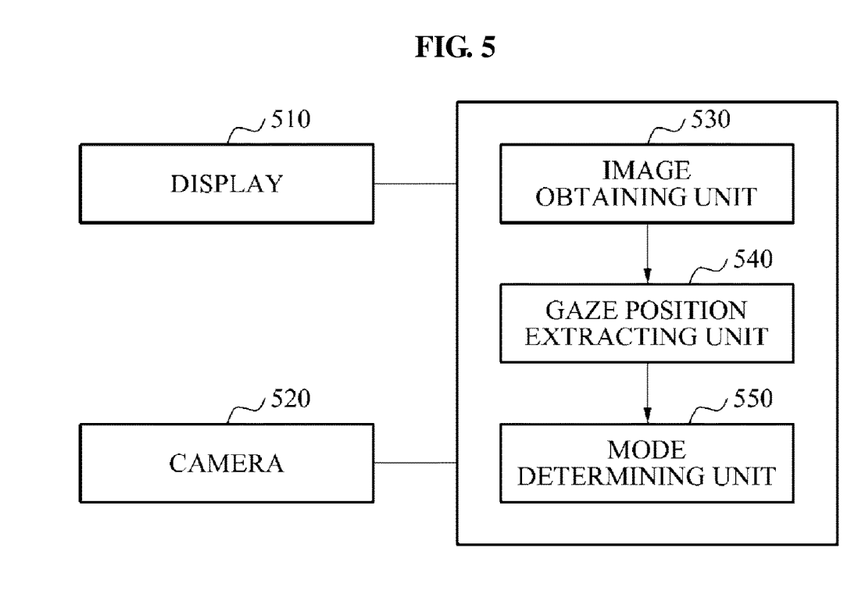
FIG. 5 illustrates an apparatus for a user interface using a gaze interaction according to example embodiments.

FIG. 5 illustrates an apparatus for a user interface using a gaze interaction according to example embodiments.

Referring to FIG. 5, the apparatus for the user interface using the gaze interaction may include a display 510 and a camera 520.

An image obtaining unit 530 may obtain an image including eyes of a user, using the camera 520.

A gaze position estimating unit 540 may estimate a gaze position of the user, using the image including the eyes of the user.

A mode determining unit 550 may determine whether to activate the gaze adjustment function for controlling the device through a gaze of the user, based on the gaze position of the user with respect to at least one toggle area on the display.

For conciseness and ease of description, details pertaining to descriptions discussed with reference to FIGS. 1 through 4 that may be applied to the apparatus for the user interface using the gaze interaction according to the example embodiment of FIG. 5 are omitted.

A portable device as used throughout the present specification includes mobile communication devices, such as a personal digital cellular (PDC) phone, a personal communication service (PCS) phone, a personal handy-phone system (PHS) phone, a Code Division Multiple Access (CDMA)-2000 (1×, 3×) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as used throughout the present specification includes a digital camera, a plasma display panel, and the like.

The method for the user interface using the gaze interaction according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the apparatuses described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method for a user interface using a gaze interaction, the method comprising:
   obtaining, using a camera, an image including eyes of a user using at least two internal light sources included in a display of a device comprising pixels for displaying an image;
   changing at least one of a position or a shape of the at least two internal light sources, in response to an occurrence of noise by an external light source;
   estimating, using the obtained image, a gaze position of the user with respect to at least one toggle area on the display, based on the at least two changed internal light sources; and
   determining, based on the estimated gaze position, whether to activate a gaze adjustment function, wherein the gaze adjustment function controls an interface of the device using a gaze of the user,
   wherein the determining of whether to activate the gaze adjustment function comprises
      identifying a current mode of the gaze adjustment function;

determining whether the gaze position matches the at least one toggle area;

in response to the current mode being a deactivation mode, changing a mode of the gaze adjustment function to an activation mode, based on a result of the determination; and in response to the current mode being the activation mode, changing the mode of the gaze adjustment function to the deactivation mode, based on the result of the determination.

2. The method of claim 1, wherein the at least one toggle area comprises:
at least one calibration point.

3. The method of claim 1, wherein the at least one toggle area comprises:
at least one of a plurality of objects displayed on the display.

4. The method of claim 1, wherein the estimating of the gaze position of the user further comprises:
extracting respective positions of at least two glints, being an area in which the at least two internal light sources are displayed on the eyes of the user, respectively, based on the image including the eyes of the user;
calculating a position of a cornea center of the eyes of the user, using respective positions of the at least two internal light sources and the respective positions of the at least two glints;
calculating respective positions of a pupil center of each of the eyes of the user, using the respective positions of the cornea center of the eyes of the user;
calculating respective directions of an optical axis of each of the eyes of the user, using the calculated respective positions of the cornea center and the calculated respective positions of the pupil center of each of the eyes of the user;
calculating respective directions of a visual axis of each of the eyes of the user, based on the calculated respective directions of the optical axis of each of the eyes of the user; and
identifying the gaze position, using an intersection point of the calculated respective visual axes of each of the eyes of the user.

5. The method of claim 1, further comprising:
removing noise by at least one external light source,
wherein the removing of the noise by the at least one external light source comprises:
changing at least one of a position, a color, and a shape of the at least two internal light sources by determining at least one of a position, a color, and a shape of an image associated with the at least two internal light sources;
separating the at least two changed internal light sources and the at least one external light source; and
estimating the gaze position of the user, based on the at least two changed internal light sources.

6. The method of claim 1, wherein the determining of whether to activate the gaze adjustment function comprises:
determining whether the gaze position matches the at least one toggle area; and
setting the gaze adjustment function to be an activation mode or a deactivation mode, based on a result of the determination.

7. The method of claim 6, wherein the determining of whether the gaze position matches the at least one toggle area further comprises:
determining whether the gaze position matches the at least one toggle area within a predetermined period of time.

8. The method of claim 6, wherein the determining of whether the gaze position matches the at least one toggle area further comprises:
determining whether the gaze position matches the at least one toggle area, based on a predetermined pattern.

9. The method of claim 6, wherein the determining of whether to activate the gaze adjustment function further comprises:
setting a default value of the gaze adjustment function to be the deactivation mode;
setting the gaze adjustment function to be the activation mode during a predetermined period of time when the gaze position matches the at least one toggle area, based on the result of the determination.

10. The method of claim 1, further comprising:
setting at least two vertex areas from among a plurality of vertex areas of the display to be the at least two internal light sources.

11. The method of claim 1, wherein the at least one toggle area comprises a predetermined area present on the display for determining whether to activate or deactivate the gaze adjustment function for the user interface using the gaze interaction.

12. The method of claim 1, wherein the determining whether the gaze position matches the at least one toggle area comprises:
determining whether a sequence of gaze positions matches a sequence of toggle areas based on a predetermined pattern.

13. A method of changing content of a mobile device having a display with a plurality of toggle areas, the display further comprising pixels for displaying an image, the method comprising:
obtaining an image including eyes of the user using at least two internal light sources included in the display;
changing at least one of a position or a shape of the at least two internal light sources, in response to an occurrence of noise by an external light source;
monitoring, based on the obtained image, a gaze position of the user, based on the at least two changed internal light sources;
determining, based on the monitored gaze position, whether to activate a gaze adjustment function, wherein the gaze adjustment function controls an interface of the mobile device using a gaze of the user;
determining, based on the monitored gaze position, whether the user has gazed at the plurality of toggle areas according to a predetermined pattern; and
changing the content of the mobile device based on the monitored gaze position of the user and a predetermined rule when an activation mode has been activated,
wherein the determining of whether to activate the gaze adjustment function comprises
identifying a current mode of the gaze adjustment function;
determining whether the gaze position matches the toggle areas;
in response to the current mode being a deactivation mode, changing a mode of the gaze adjustment function to the activation mode, based on a result of the determination; and
in response to the current mode being the activation mode, changing the mode of the gaze adjustment function to the deactivation mode, based on the result of the determination.

14. The method of claim 13, wherein the predetermined rule comprises scrolling the content of the mobile device downward when the gaze position of the user is monitored as directed towards a bottom portion of the display of the mobile device.

15. The method of claim 13, wherein the predetermined rule comprises enlarging the content displayed on a predetermined portion of the display of the mobile device when the gaze position of the user is monitored as directed towards the predetermined portion.

16. A method for controlling content of a mobile device having a display with a toggle area, the method comprising:
obtaining an image including eyes of a user using at least two internal light sources included in the display of the mobile device comprising pixels for displaying an image;
changing at least one of a position or a shape of the at least two internal light sources, in response to an occurrence of noise by an external light source;
monitoring a gaze position of the user based on the at least two changed internal light sources;
determining, based on the monitored gaze position, whether the user has gazed at the toggle area for a threshold amount of time;
upon determining that the user has gazed at the toggle area for the threshold amount of time, setting a mode of a gaze adjustment function of the mobile device to an activation mode,
wherein the gaze adjustment function controls an interface of the mobile device using a gaze of the user; and
controlling the content of the mobile device based on a position of a user gaze while the mode of the gaze adjustment function of the mobile device is in the activation mode.

17. An apparatus for a user interface using a gaze interaction, the apparatus comprising:
a display comprising pixels for displaying an image;
a camera;
a processor configured to
obtain, using the camera, an image including eyes of a user, using at least two internal light sources included in the display;
changing at least one of a position or a shape of the at least two internal light sources, in response to an occurrence of noise by an external light source;
estimate, using the obtained image, the gaze position of the user with respect to at least one toggle area on the display, based on the at least two changed internal light sources; and
determine, based on the estimated gaze position, whether to activate a gaze adjustment function, wherein the gaze adjustment function controls an interface of the apparatus using the gaze of the user,
wherein the processor is configured to determine whether to activate the gaze adjustment function by
identifying a current mode of the gaze adjustment function;
determining whether the gaze position matches the at least one toggle area;
in response to the current mode being a deactivation mode, changing a mode of the gaze adjustment function to an activation mode, based on a result of the determination; and
in response to the current mode being the activation mode, changing the mode of the gaze adjustment function to the deactivation mode, based on the result of the determination.

18. A user interface method in a mobile device having a display comprising pixels for displaying an image, the method comprising:
displaying an icon on the display while a user waits for content to be loaded onto the display;
obtaining an image including eyes of the user using at least two internal light sources included in the display;
changing at least one of a position or a shape of the at least two internal light sources, in response to an occurrence of noise by an external light source;
estimating, using the obtained image, a gaze position of the user by using the icon as a calibration point, based on the at least two changed internal light sources; and
determining, based on the estimated gaze position, whether to activate a gaze adjustment function, wherein the gaze adjustment function controls an interface of the device using a gaze of the user,
wherein the determining of whether to activate the gaze adjustment function comprises
identifying a current mode of the gaze adjustment function;
determining whether the gaze position matches the at least one toggle area;
in response to the current mode being a deactivation mode, changing a mode of the gaze adjustment function to an activation mode, based on a result of the determination; and
in response to the current mode being the activation mode, changing the mode of the gaze adjustment function to the deactivation mode, based on the result of the determination.

19. A method of unlocking content of a mobile device having a display with a plurality of toggle areas, the display further comprising pixels for displaying an image, the method comprising:
obtaining an image including eyes of the user using at least two internal light sources included in the display;
changing at least one of a position or a shape of the at least two internal light sources, in response to an occurrence of noise by an external light source;
monitoring, based on the obtained image, a gaze position of the user based on the at least two changed internal light sources;
determining, based on the monitored gaze position, whether to activate a gaze adjustment function, wherein the gaze adjustment function controls an interface of the mobile device using a gaze of the user;
determining, based on the monitored gaze position, whether the user has gazed at the plurality of toggle areas according to a pattern; and
unlocking the content of the mobile device upon determining that the user has gazed at the plurality of toggle areas according to the pattern,
wherein the determining of whether to activate the gaze adjustment function comprises
identifying a current mode of the gaze adjustment function;
determining whether the gaze position matches the toggle areas;
in response to the current mode being a deactivation mode, changing a mode of the gaze adjustment function to an activation mode, based on a result of the determination; and
in response to the current mode being the activation mode, changing the mode of the gaze adjustment function to the deactivation mode, based on the result of the determination.

20. A method of locking content of a mobile device having a display with a plurality of toggle areas, the display further comprising pixels for displaying an image, the method comprising:
- obtaining an image including eyes of a user using at least two internal light sources included in the display;
- changing at least one of a position or a shape of the at least two internal light sources, in response to an occurrence of noise by an external light source;
- monitoring, based on the obtained image, a gaze position of the user based on the at least two changed internal light sources;
- determining, based on the monitored gaze position, whether to activate a gaze adjustment function, wherein the gaze adjustment function controls an interface of the mobile device using a gaze of the user;
- determining, based on the monitored gaze position, whether the user has gazed at the toggle areas according to a predetermined pattern; and
- locking the content of the mobile device when it has been determined that the user has gazed at the toggle areas according to the predetermined pattern, wherein the determining of whether to activate the gaze adjustment function comprises
- identifying a current mode of the gaze adjustment function;
- determining whether the gaze position matches the toggle areas;
- in response to the current mode being a deactivation mode, changing a mode of the gaze adjustment function to an activation mode, based on a result of the determination; and
- in response to the current mode being the activation mode, changing the mode of the gaze adjustment function to the deactivation mode, based on the result of the determination.

* * * * *